US012720243B2

(12) United States Patent
Guo et al.

(10) Patent No.: US 12,720,243 B2
(45) Date of Patent: Aug. 25, 2026

(54) SPEAKER STRUCTURE

(71) Applicant: Tymphany HK Limited, Hong Kong (HK)

(72) Inventors: Yikai Guo, Taipei (TW); Tianbao Xie, Taipei (TW); Kaijiu Tan, Taipei (TW)

(73) Assignee: Tymphany HK Limited, Wanchai (HK)

( * ) Notice: Subject to any disclaimer, the term of this patent is extended or adjusted under 35 U.S.C. 154(b) by 178 days.

(21) Appl. No.: 18/886,540

(22) Filed: Sep. 16, 2024

(65) Prior Publication Data

US 2025/0097616 A1 Mar. 20, 2025

Related U.S. Application Data

(60) Provisional application No. 63/583,725, filed on Sep. 19, 2023.

(51) Int. Cl.
*H04R 1/02* (2006.01)

(52) U.S. Cl.
CPC ......... *H04R 1/025* (2013.01); *H04R 2201/02* (2013.01); *H04R 2499/13* (2013.01)

(58) Field of Classification Search
CPC .... H04R 1/025; H04R 1/026; H04R 2201/02; H04R 2201/021; B60R 11/0217
USPC .......................................................... 381/332
See application file for complete search history.

(56) References Cited

U.S. PATENT DOCUMENTS

2025/0092715 A1* 3/2025 Guo ...................... E05B 15/101

FOREIGN PATENT DOCUMENTS

| | | | | |
|---|---|---|---|---|
| CN | 222814498 U | * | 4/2025 | |
| KR | 200386680 Y1 | * | 6/2005 | .............. H01H 3/28 |
| TW | M555155 U | * | 2/2018 | |

* cited by examiner

*Primary Examiner* — David L Ton
(74) *Attorney, Agent, or Firm* — Muncy, Geissler, Olds & Lowe, P.C.

(57) ABSTRACT

A speaker structure includes a speaker has a fixing assembly. A base has a case, a press assembly, a connecting assembly and locking assembly. The surface of the case has an accommodating groove. The speaker installed within the accommodating groove. The connecting assembly and the locking assembly is disposed within the case. One end of the press assembly extends through the case. One end of the press assembly moves in conjunction with the connecting assembly. The connecting assembly is for unlocking the locking assembly. One end of the locking assembly extends through the case into the accommodating groove. One end of the locking assembly and the fixing assembly are fixed to each other. Pushing one end of the press assembly inward the case, the press assembly moves in conjunction with the connecting assembly to unlock the locking assembly. The locking assembly is released from the connection with the fixing assembly.

10 Claims, 9 Drawing Sheets

SPEAKER STRUCTURE

CROSS REFERENCE TO RELATED APPLICATION

This application claims priority of U.S. Provisional Application No. 63/583,725 filed on Sep. 19, 2023 under 35 U.S.C. § 119(e), the entire contents of which are hereby incorporated by reference.

BACKGROUND OF THE INVENTION

The present application relates to the technical field of speaker structures, and more particularly to a detachable speaker structure.

DESCRIPTION OF THE PRIOR ART

Currently, the design of vehicle-mounted speaker structures typically involves securing them inside the vehicle body. If the speaker becomes damaged, it usually needs to be removed from the vehicle for repair or replacement. However, removing the speaker requires not only specialized disassembly tools but also a complex disassembly process. As a result, it is generally difficult for ordinary users to perform the disassembly themselves. Even professional technicians may find the process time-consuming.

SUMMARY OF THE INVENTION

The present application provides a speaker structure that, allows the speaker to be detached from the base by pressing a button to release the fixed connection between the speaker and the base, to solve the problem that the speaker is inconvenient to assemble and disassemble.

To address the above technical problem, the present application is implemented as follows:

The present application provides a speaker structure including a speaker and a base. The speaker has a fixing assembly. The base has a case, a press assembly, a connecting assembly and a locking assembly. The surface of the case has an accommodating groove, the speaker is installed within the accommodating groove. The connecting assembly and the locking assembly is disposed within the case. One end of the press assembly extends through the case and one end of the press assembly move in conjunction with the connecting assembly. The connecting assembly is for unlocking the locking assembly. One end of the locking assembly extends through the case into the accommodating groove, one end of the locking assembly connects and fixes to the fixing assembly; wherein, pushing one end of the press assembly inward the case, the press assembly moves in conjunction with the connecting assembly to unlock the locking assembly, and the locking assembly is released from the connection and fixation with the fixing assembly of the speaker.

According to one embodiment of the present application, the press assembly includes a press element and a guide post. The press element has a press portion and two extension portion; one end of each of the two the extension portion extends from the press portion toward an inner part of the case, the guide post is disposed at one end of the extension portion. The connecting assembly includes a connection main body and the connection main body has two pushing portions. The two pushing portions extend from the connection main body toward the positions where the two extension portions of the press element are located. The pushing portion has a slide hole, the guide post at one end of the press element passes through the slide hole of the pushing portion, and the guide post of the press element moves along the slide hole.

According to one embodiment of the present application, the press assembly includes a press elastic member and the press elastic member is disposed between the press element and the surface of the case, wherein the elastic force direction of the press elastic member and the movement direction of the press element is the first axis.

According to one embodiment of the present application, an angle is formed between the slide hole of the pushing portion relative to the movement direction of the press element toward the pushing portion.

According to one embodiment of the present application, the connection main body of the connecting assembly further has a pressing element, the locking assembly further includes a lock pin, and the pressing element corresponds to the lock pin of the locking assembly. When the press element drives the connection main body to move downward, the pressing element pushing down the lock pin to unlock the locking assembly, then the locking assembly releases a connection and fixation relative to the fixing assembly.

According to one embodiment of the present application, the connecting assembly further has a connecting elastic portion, the connection main body of the connecting assembly further has an elastic fixing portion, one end of the connecting elastic portion connects to the elastic fixing portion, another end of the connecting elastic portion connects to the inner part of the case, wherein the elastic force direction of the connecting elastic portion and a direction that the pressing element of the connection main body pushes down the lock pin is the second axis.

According to one embodiment of the present application, the locking assembly further includes a lock housing and a lock pin elastic element, the lock housing is disposed within the case, one end of the lock pin elastic element connects to the lock housing, another end of the lock pin elastic element connects to the lock pin, wherein the elastic force direction of the lock pin elastic element and the movement direction of the lock pin is the second axis.

According to one embodiment of the present application, the locking assembly further includes a lock housing, a lock unit and the lock elastic element. The lock housing is disposed within the case, the lock unit extends through the lock housing. One end of the lock unit extends through the case into the accommodating groove. One end of the lock unit connects to the fixing assembly fixed to the speaker, one end of the lock elastic element connects to the lock housing, another end of the lock elastic element connects to another end of the lock unit, wherein the elastic force direction of the lock elastic element and the movement direction of the lock unit is the first axis.

According to one embodiment of the present application, the recess contour of the accommodating groove corresponds to a contour of a side of the speaker having the fixing assembly.

According to one embodiment of the present application, the fixing assembly has a recess and a stationary post, two ends of the stationary post are fixed to a recess inner wall of the recess, and one end of the lock unit is fixed to the stationary post within the recess.

The present application provides a speaker structure including a speaker and a base. The speaker is locked to the base. The base fixes or unlocks the speaker through the linkage of the press assembly, the connecting assembly and the locking assembly. The locking assembly of the base is applied for fixing the speaker. By using the press assembly to interact with the connecting assembly, the connecting assembly unlocks the speaker fixed by the locking assembly. Thus, the speaker can be easily detached from the base without spending too much time.

BRIEF DESCRIPTION OF DRAWINGS

The accompanying drawings described here are provided to further understand the present invention and constitute a part of the present invention. The illustrative embodiments and descriptions of the present invention are intended to explain the present invention and do not constitute undue limitations to the present invention. In the drawings.

DETAILED DESCRIPTION

Figure 1:
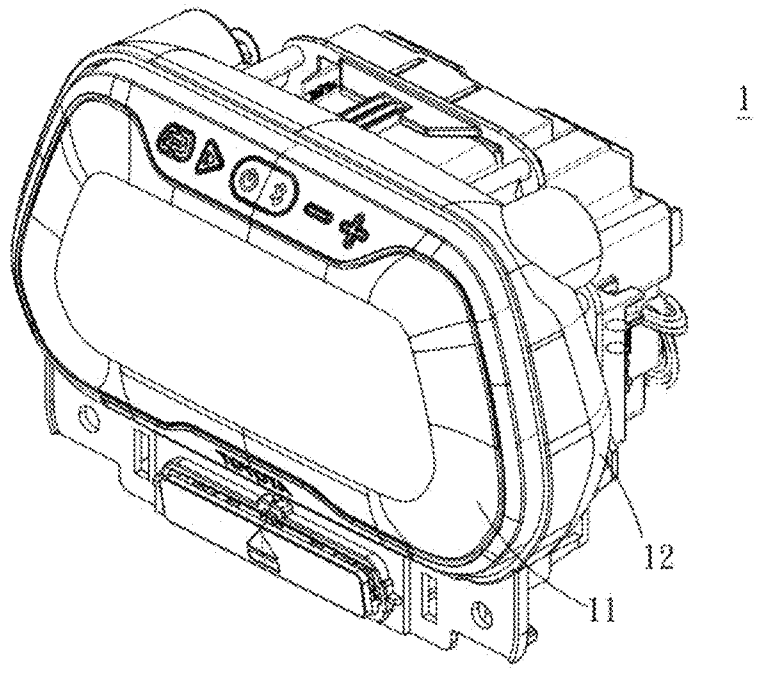
FIG. 1 is a perspective view of the speaker structure of the present application.

The following will disclose multiple embodiments of the present invention with reference to the drawings. For the sake of clear explanation, many implementation details will be described together in the following narrative. However, it should be understood that these implementation details should not be used to limit the present invention. In other words, in some embodiments of the present invention, these implementation details are not necessary. Additionally, for the sake of simplifying the drawings, some conventional structures and components will be depicted in a simplified schematic manner. In the following embodiments, the same reference numerals will be used to denote the same or similar components.

Figure 2:
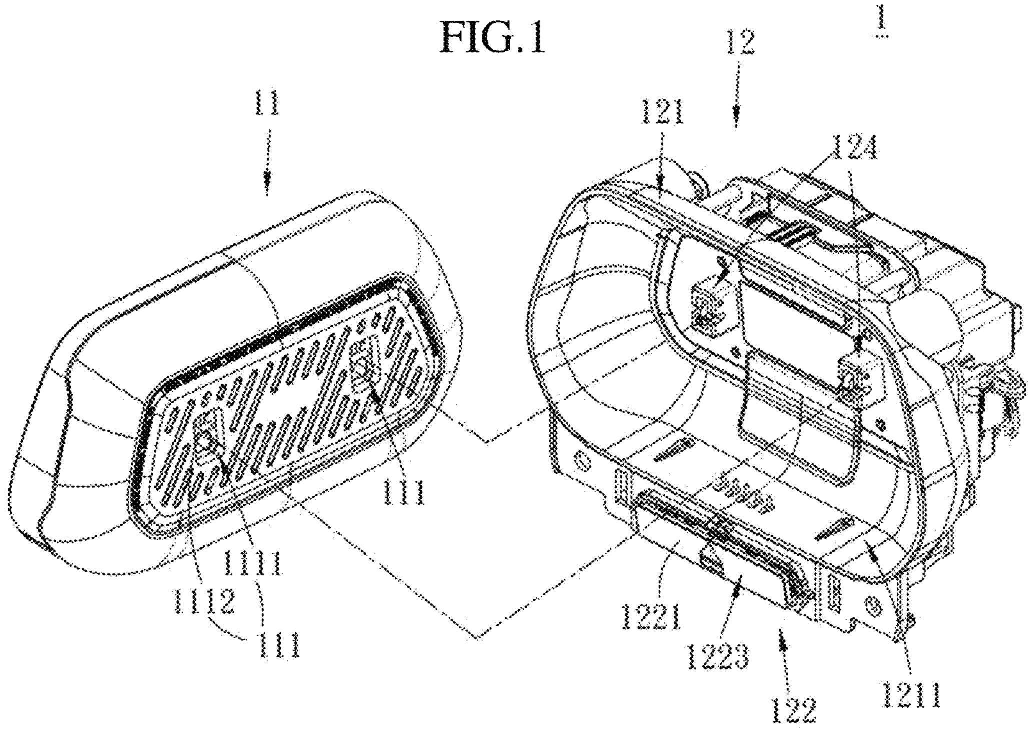
FIG. 2 is an exploded view of the speaker structure of the present application.
Figure 3:
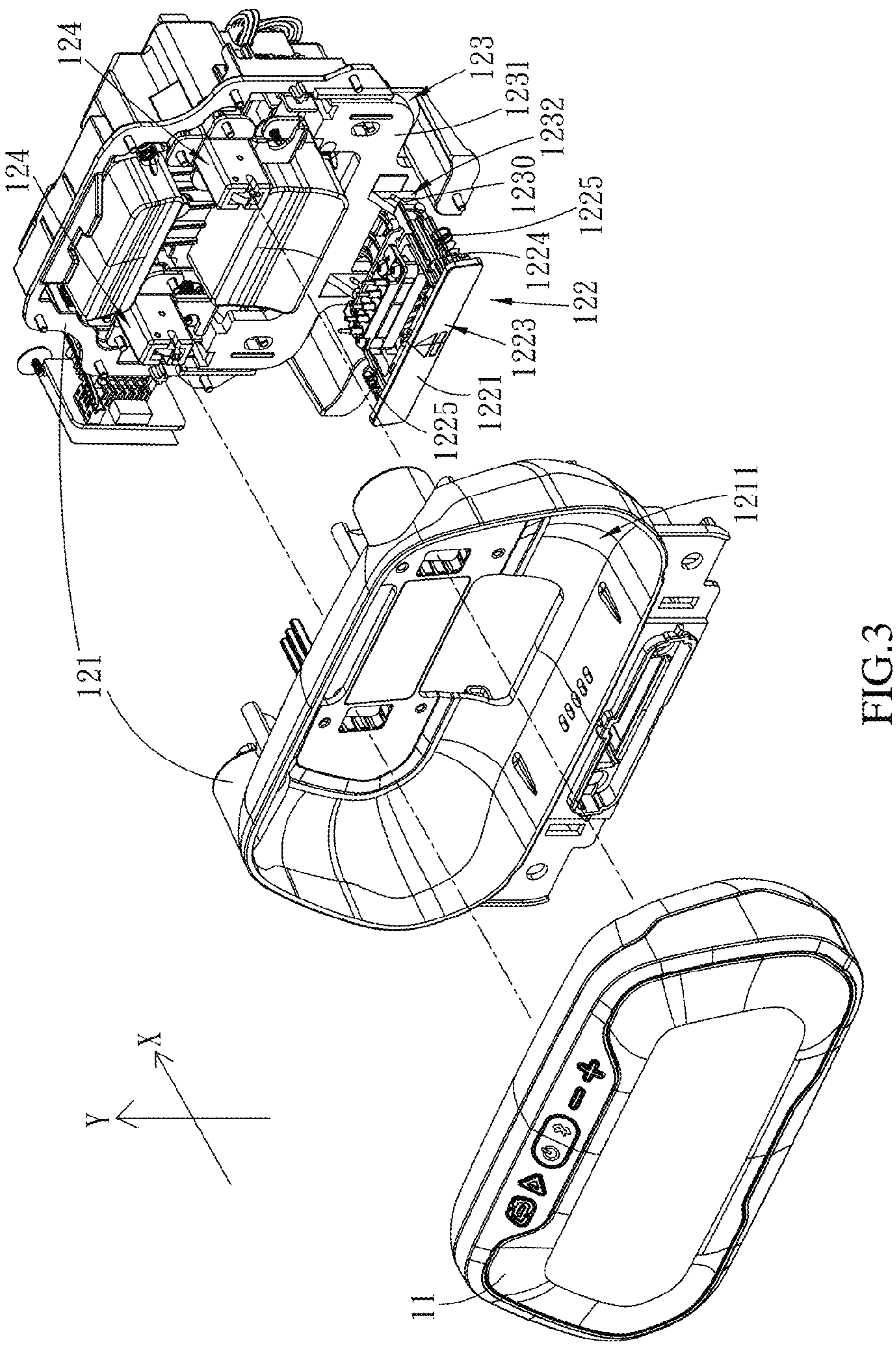
FIG. 3 is an exploded assembly view of the speaker structure of the present application.
Figure 4:
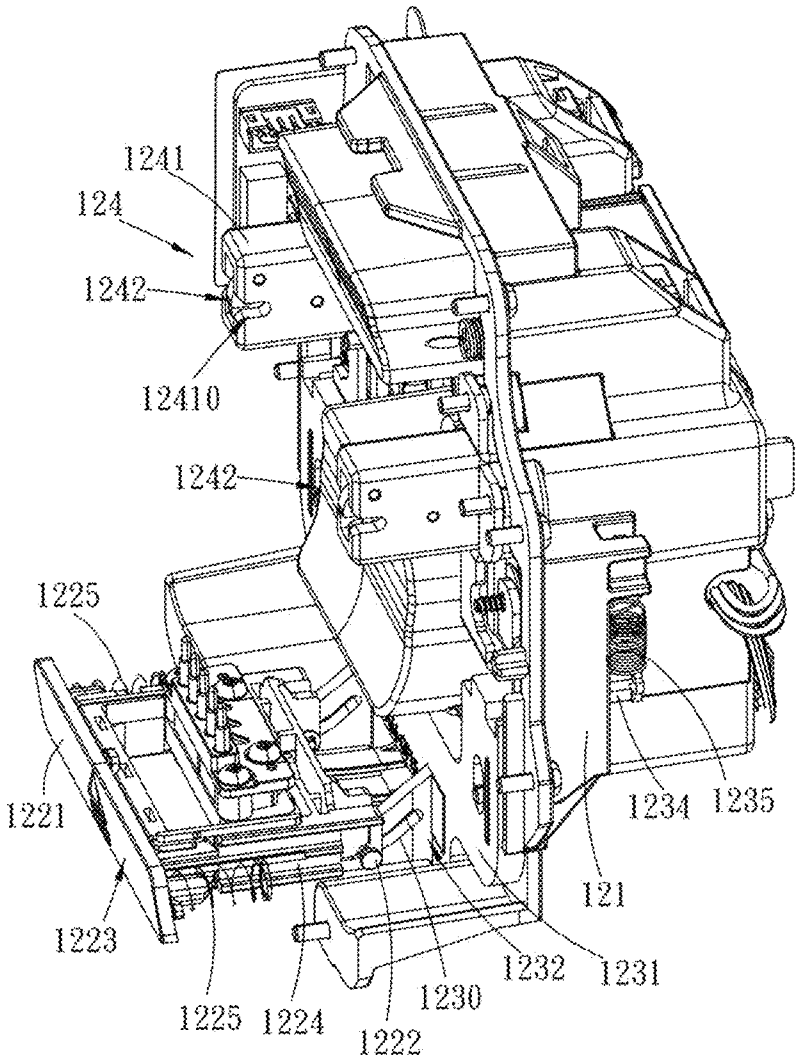
FIG. 4 is a partial perspective view of the speaker structure of the present application.
Figure 5:
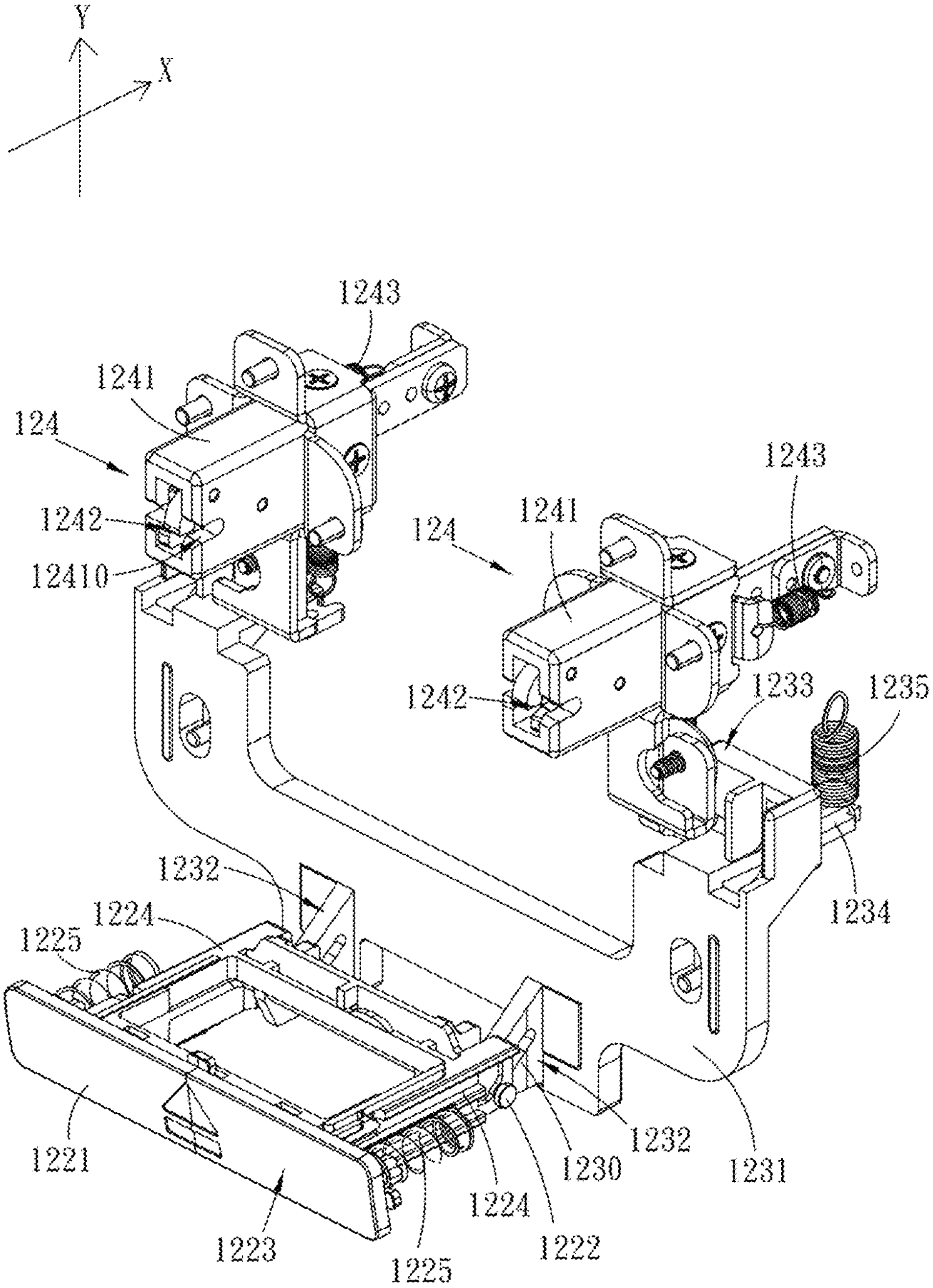
FIG. 5 is a combination view of the press assembly, the connecting assembly and the locking assembly of the present application.

FIG. 1 is a perspective view of the speaker structure of the present application; FIG. 2 is an exploded view of the speaker structure of the present application; FIG. 3 is an exploded assembly view of the speaker structure of the present application; FIG. 4 is a partial perspective view of the speaker structure of the present application; and FIG. 5 is a combination view of the press assembly, the connecting assembly and the locking assembly of the present application. As shown in FIG. 1 to FIG. 5, the present application provides a speaker structure 1 including a speaker 11 and a base 12. The speaker 11 has a fixing assembly 111. The base 12 has a case 121, a press assembly 122, a connecting assembly 123 and a locking assembly 124. The surface of the case 121 has an accommodating groove 1211. The speaker 11 is installed within the accommodating groove 1211. The connecting assembly 123 and the locking assembly 124 are disposed within the case 121. One end of the press assembly 122 extends through into the case 121 and one end of the press assembly 122 moves in conjunction with the connecting assembly 123. The connecting assembly 123 is applied to unlock the locking assembly 124. One end of the locking assembly 124 extends through the case 121 into the accommodating groove 1211. One end of the locking assembly 124 is connected and fixed to the fixing assembly 111. One end of press assembly 122 is pushed inward the case 121, the press assembly 122 moves in conjunction with connecting assembly 123 to unlock the locking assembly 124, such that the locking assembly 124 is released from the connection with the fixing assembly 111 of the speaker 11.

Referring to FIG. 2, in this embodiment, the groove contour of the accommodating groove 1211 of the base 12 corresponds to the contour of the side of the speaker 11 having the fixing assembly 111. The fixing assembly 111 has a recess 1111 and a stationary post 1112. Two ends of the stationary post 1112 are fixed to the inner wall of the recess 1111. One end of the locking assembly 124 is fixed to the stationary post 1112 within the recess 1111.

Figure 6:
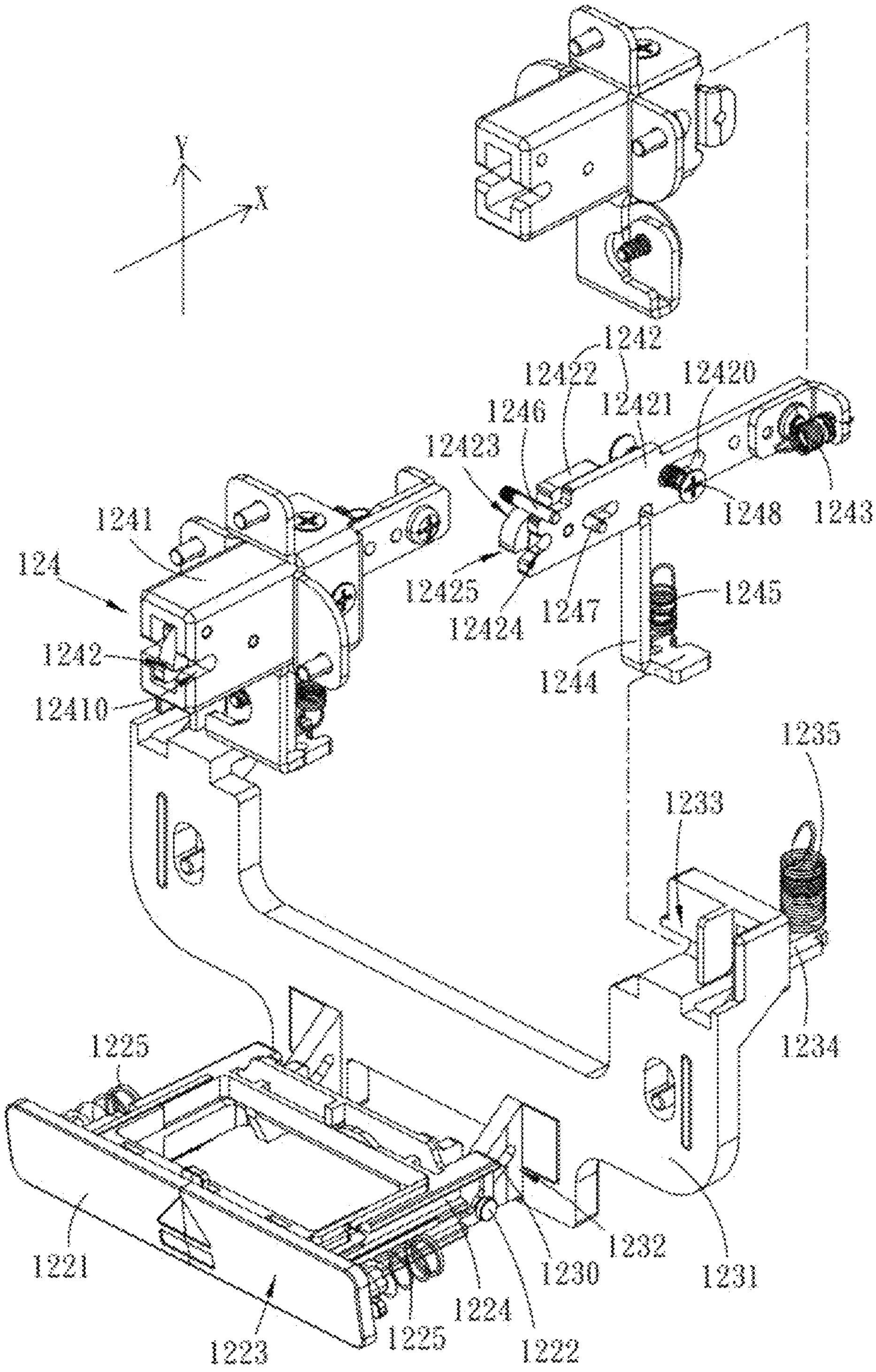
FIG. 6 is a partial exploded view of the press assembly, the connecting assembly and the locking assembly of the present application.
Figure 7:
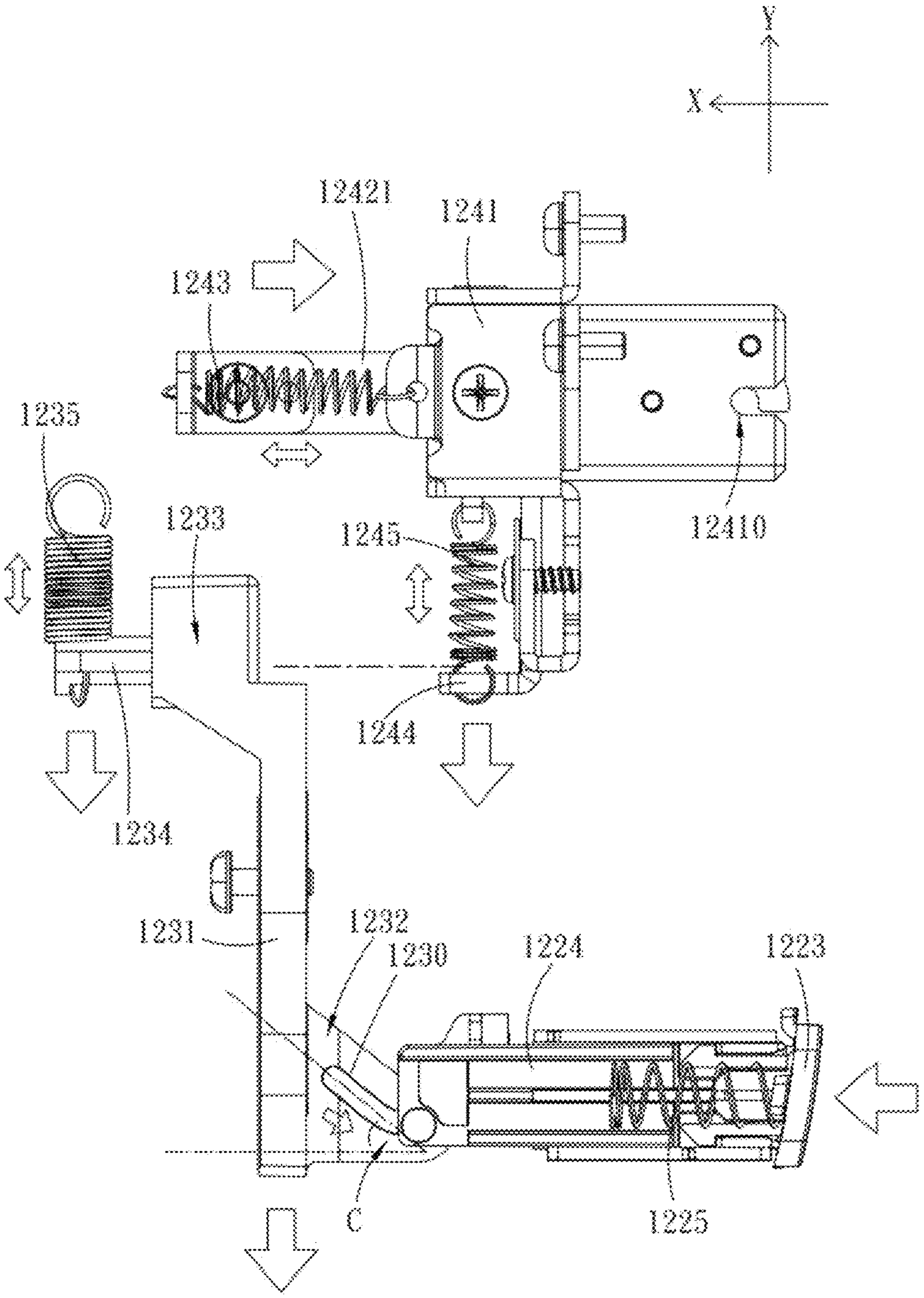
FIG. 7 is a side view of the press assembly, the connecting assembly and the locking assembly of the present application.

FIG. 6 is a partial exploded view of the press assembly, the connecting assembly and the locking assembly of the present application and FIG. 7 is a side view thereof. As shown in FIG. 6 and FIG. 7, in this embodiment, the press assembly 122 includes a press element 1221 and a guide post 1222. The press element 1221 has a press portion 1223 and two extension portions 1224. One end of each of the two extension portions 1224 extends from the press portion 1223 toward the inner part of case 121. The guide post 1222 is disposed at one end of the extension portion 1224; i.e., the guide post 1222 is transversely located at one end of the extension portion 1224 and both ends of the guide post 1222 are fixed to the extension portion 1224. Additionally, the connecting assembly 123 includes a connection main body 1231. The connection main body 1231 has two pushing portions 1232. The two pushing portion 1232 extend from the connection main body 1231 toward the positions where the two extension portion 1224 of the press element 1221 are located. The pushing portion 1232 has a slide hole 1230 and the slide hole 1230 is a transverse opening corresponding to the guide post 1222. The guide post 1222 at one end of the press element 1221 passes through the slide hole 1230 of the pushing portion 1232, and the guide post 1222 of the press element 1221 moves along the slide hole 1230. The slide hole 1230 of the pushing portion 1232 forms an angle C relative to the movement direction of the press element 1221 toward the pushing portion 1232. In other words, when the extension portion 1224 of the press element 1221 moves along with the guide post 1222, because the guide post 1222 moves in a straight line, the guide post 1222 will press against the edge of the lower opening of the slide hole 1230. As a result, the pushing portion 1232 will be pressed downward and move due to the downward pressure of the slide hole 1230. Consequently, the pushing portion 1232 will move downward in conjunction with the connection main body 1231.

Furthermore, the press assembly 122 includes a press elastic member 1225. The press elastic member 1225 is disposed between the press element 1221 and the surface of the case 121, wherein the elastic force direction of the press elastic member 1225 and the movement direction of the press element 1221 is the first axis X. In this embodiment, when the press element 1221 is pushed inward the case 121, the press element 1221 compresses the elastic force of the press elastic member 1225. When the press element 1221 is no longer subjected to the external pressure, the elastic restoring force of the press elastic member 1225 drives the press element 1221 back to its original position before being pressed.

Figure 8:
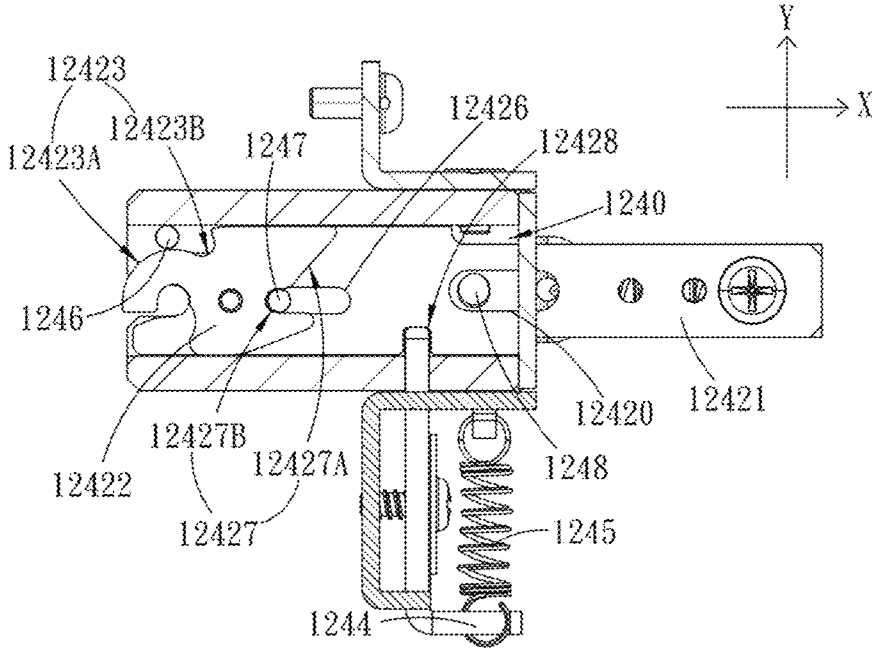
FIG. 8 is a schematic view of the locking assembly of the present application.
Figure 9:
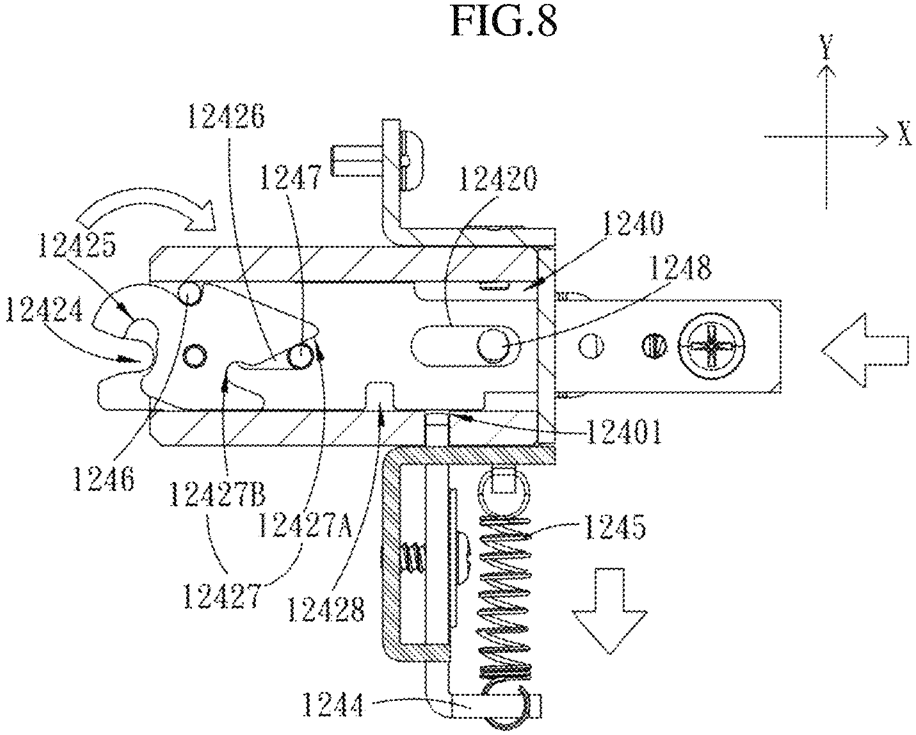
FIG. 9 is a cross-sectional view of the locking assembly of the present application.

FIG. 8 is a schematic view of the locking assembly of the present application and FIG. 9 is a cross-sectional view of the locking assembly. Referring to FIG. 6 as well, in this embodiment, the connection main body 1231 of the connecting assembly 123 further has a pressing element 1233. The locking assembly 124 includes a lock housing 1241, a lock unit 1242, a lock elastic element 1243, a lock pin 1244, and a lock pin elastic element 1245. The lock housing 1241 is disposed within the case 121. The lock unit 1242 extends through the lock housing 1241. One end of the lock unit 1242 extends through the case 121 into the accommodating groove 1211, and one end of the lock unit 1242 connects to the fixing assembly 111 of the speaker 11. One end of the lock elastic element 1243 connects to the lock housing 1241, and another end of the lock elastic element 1243 connects to another end of the lock unit 1242. One end of the lock pin 1244 extends through the lock housing 1241, and one end of the lock pin 1244 is engaged with a side of the lock unit 1242. One end of the lock pin elastic element 1245 connects to the lock housing 1241. Another end of the lock pin elastic element 1245 connects to another end of the lock pin 1244. The lock pin elastic element 1245 drives the lock pin 1244 to abut against a side of the lock unit 1242. The pressing element 1233 of the connection main body 1231 corresponds to another end of the lock pin 1244 of the locking assembly 124, wherein the pressing element 1233 moves in conjunction with another end of the lock pin 1244. The connection between the pressing element 1233 and the lock pin 1244 can be achieved through structural interlocking, adhesive bonding, or other assembly methods, which can be adjusted according to user requirements but are not limited to these methods.

Referring to FIG. 7, when the press element 1221 drives the connection main body 1231 to move downward, the pressing element 1233 pushes down on another end of the lock pin 1244. This causes one end of the lock pin 1244 to move away from a side of the lock unit 1242, disengaging the lock pin 1244 from the side of the lock unit 1242. Consequently, the lock elastic element 1243 drives the lock unit 1242 to move, releasing the end of the lock unit 1242 from its connection and fixation with the fixing assembly 111 of the speaker 11. The elastic force direction of the lock elastic element 1243 and the movement direction of the lock unit 1242 is the first axis X.

As described above, the lock housing 1241 includes a lock pin channel 1240 and a fixed through hole 12401. The fixed through hole 12401 locates on the surface of the lock housing 1241, and the fixed through hole 12401 is communicating with the lock pin channel 1240. The lock unit 1242 further includes a moving element 12421, and a side of the moving element 12421 has a fixed notch 12428. The fixed through hole 12401 locates on the movement path of the fixed notch 12428 of the moving element 12421. One end of the lock pin 1244 passes though the fixed through hole 12401. One end of the lock pin 1244 is embedded within the fixed notch 12428 to allow one end of the lock pin 1244 to be engaged with a side of the lock unit 1242.

Moreover, the connection main body 1231 of the connecting assembly 123 further has an elastic fixing portion 1234. The connecting assembly 123 further has a connecting elastic portion 1235. One end of the connecting elastic portion 1235 connects to the elastic fixing portion 1234, and another end of the connecting elastic portion 1235 connects to the inner part of the case 121 (see FIG. 4). The elastic force direction of the connecting elastic portion 1235 and the direction in which the pressing element 1233 of the connection main body 1231 presses down the lock pin 131 is the second axis Y. In this embodiment, when the press element 1221 drives the connection main body 1231 to move downward, the elastic fixing portion 1234 of the connection main body 1231 stretches the elastic force of the connecting elastic portion 1235. When the connection main body 1231 is no longer driven downward by an external force, the elastic restoring force of the connecting elastic portion 1235 will drive the connection main body 1231 back to its original position. Additionally, the elastic force direction of the lock pin elastic element 1245 of the locking assembly 124 and the movement direction of the lock pin 1244 is the second axis Y (see FIG. 9). In this embodiment, when pressing element 1233 drives the lock pin 1244 to move downward, the lock pin 1244 stretches the elastic force of the lock pin elastic element 1245. When the lock pin 1244 is no longer driven downward by an external force, the elastic restoring force of the lock pin elastic element 1245 will drive the lock pin 1244 back to its original position.

Referring to FIG. 7, in this embodiment, the elastic force direction of the press elastic member 1225 and the pressing direction of the press element 1221 is the first axis X. The elastic force direction of the connecting elastic portion 1235 and the movement direction of the elastic fixing portion 1234 of the connection main body 1231 is the second axis Y. The elastic force direction of the lock pin elastic element 1245 and the movement direction of the lock pin 1244 is the second axis Y. The elastic force direction of the lock elastic element 1243 and the movement direction of the lock unit 1242 is the first axis X, and the first axis X and the second axis Y are perpendicular to each other.

In this embodiment, referring to FIG. 8 and FIG. 9, the locking assembly 124 further includes a first guide member 1246. The lock housing 1241 includes a lock pin channel 1240. The first guide member 1246 extends through the lock housing 1241, and the first guide member 1246 locates within the lock pin channel 1240. The lock unit 1242 further includes a moving element 12421 and a hook element 12422. The hook element 12422 is rotatably disposed at one end of the moving element 12421. The first guide member 1246 locates on the movement path of the first side 12423 of the hook element 12422. When the moving element 12421 moves in conjunction with the hook element 12422, the first guide member 1246 will move along the contour of the first side 12423 of the hook element 12422, causing the hook element 12422 to rotate relative to the moving element 12421.

As described above, one end of the moving element 12421 has a first concave 12424, and one end of the hook element 12422 has a second concave 12425 relative to the first concave 12424. The second concave 12425 rotates relative to the first concave 12424 to become closed or open. The first side 12423 of the hook element 12422 has an arc edge 12423A and a first concave edge 12423B. The first concave edge 12423B and the arc edge 12423A are the connected and extended side edges. When the arc edge 12423A of the hook element 12422 abuts against the first guide member 1246, the first concave 12424 and the second concave 12425 are relatively closed; when the first concave edge 12423B of the hook element 12422 abuts against the first guide member 1246, the first concave 12424 and the second concave 12425 are relatively open.

Furthermore, the locking assembly 124 further includes a second guide member 1247. The second guide member 1247 extends through the lock housing 1241, and the second guide member 1247 locates within the lock pin channel 1240. The lock unit 1242 further includes a moving element 12421 and a hook element 12422. The hook element 12422 is rotatably disposed at one end of the moving element 12421. The moving element 12421 further has a moving hole 12426, and the second guide member 1247 locates within the moving hole 12426. The second guide member 1247 locates on the movement path of the second side 12427 of the hook element 12422. When the moving element 12421 moves in conjunction with the hook element 12422, the second guide member 1247 moves along the contour of the second side 12427 of the hook element 12422, causing the hook element 12422 to rotate relative to the moving element 12421.

As described above, the second side 12427 of the hook element 12422 has an inclined edge 12427A and a second concave edge 12427B. The second concave edge 12427B and the inclined edge 12427A are the connected and extended side edges. When the second concave edge 12427B of the hook element1 2422 abuts against the second guide member 1247, the first concave 12424 and the second concave 12425 are relatively closed; when the inclined edge 12427A of the hook element 12422 abuts against the second guide member 1247, the first concave 12424 and the second concave 12425 are relatively open.

In addition, the lock housing 1241 has an opening 12410 at one end of the housing adjacent to the first concave 12424 and the second concave 12425 (see FIG. 4). The opening 12410 corresponds to the stationary post 1112 of the fixing assembly 111 of the speaker 11. When the stationary post 1112 is locked within the first concave 12424 and the second concave 12425, the stationary post 1112 is also fixed within the opening 12410, as an auxiliary fixing structure. Moreover, the locking assembly 124 further includes a position limited element 1248. The position limited element 1248 is disposed on the lock housing 1241, and the position limited element 1248 locates in the lock pin channel 1240. The lock unit 1242 further includes a moving element 12421, and the moving element 12421 further has a position limiting hole 12420. The position limited element 1248 locates within the position limiting hole 12420, thereby restricting the movement of the position limiting hole 12420 of the moving element 12421 cannot move beyond the position set by the position limited element 1248.

Figure 10:
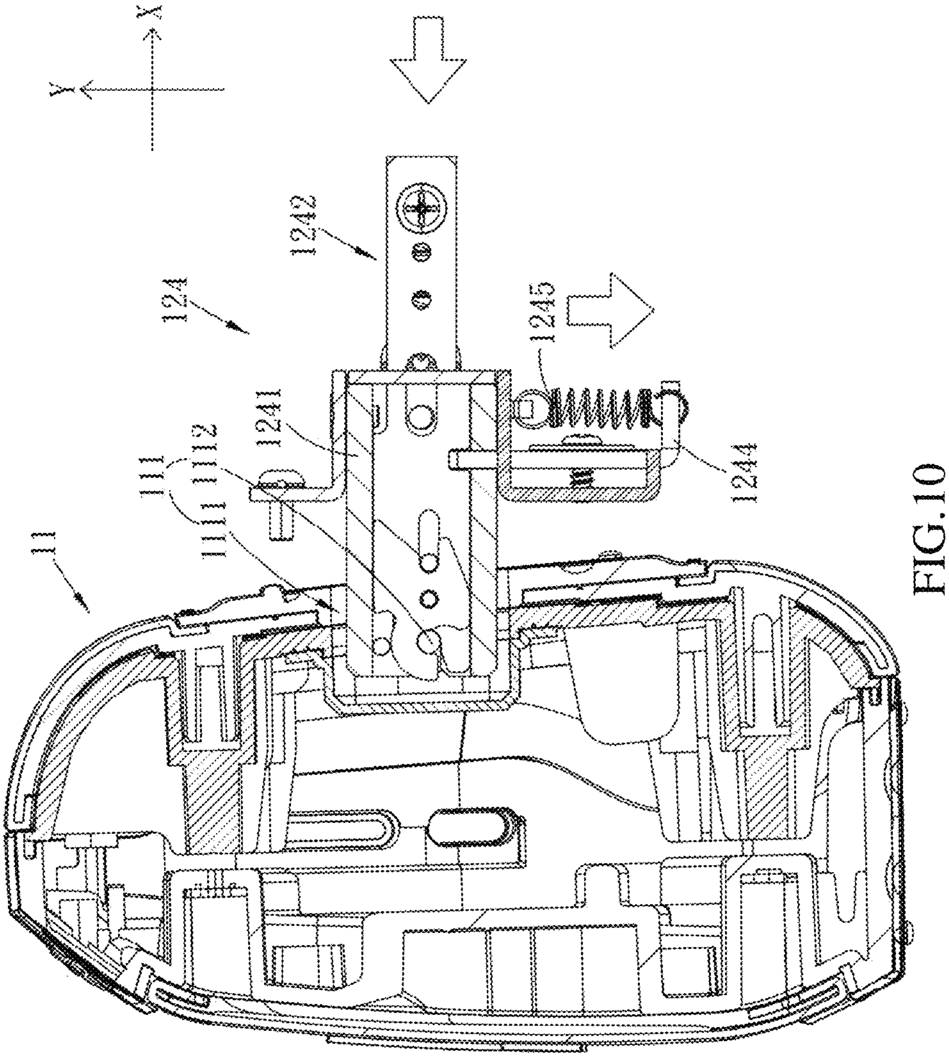
FIG. 10 is a schematic view of the combination of the locking assembly and the speaker of the present application.
Figure 11:
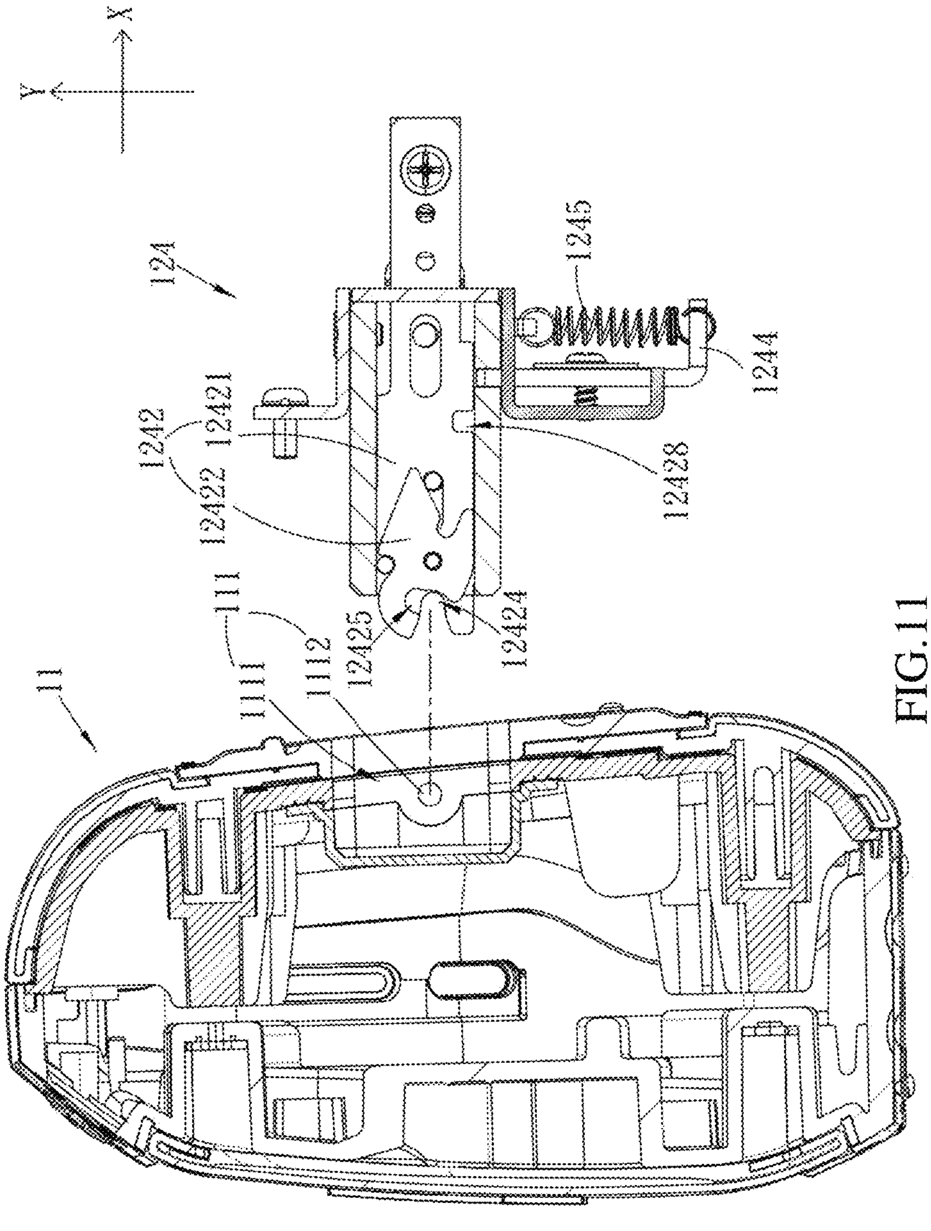
FIG. 11 is another schematic view of the combination of the locking assembly and the speaker of the present application.

FIG. 10 is a schematic view of the combination of the locking assembly and the speaker, and FIG. 11 is another schematic view of the combination of the locking assembly and the speaker. As shown in FIG. 10 and FIG. 11, in this embodiment, the fixing assembly 111 of the speaker 11 is engaged with the locking assembly 124, allowing the speaker 11 to be installed onto the base 12. To release the connection between the locking assembly 124 and the speaker 11, the pressing element 1233 pulls the lock pin 1244 downwardly, and one end of the lock pin 1244 moves away from one side of the lock unit 1242. Consequently, the lock pin 1244 is not engaged with the fixed notch 12428 of the lock unit 1242. The elastic restoring force of the lock elastic element 1243 drives the lock unit 1242 to move, and one end of the lock unit 1242 moves toward the direction of the speaker 11, causing the first concave 12424 of the moving element 12421 at one end of the lock unit 1242 and the second concave 12425 of the hook element 12422 to rotate relative to each other. Thus, the first concave 12424 and the second concave 12425 are relatively open, allowing the stationary post 1112 of the fixing assembly 111 of the speaker 11 to disengage from the locking assembly 124, thereby releasing the connection and fixation between the speaker 11 and the base 12.

Conversely, to fix the speaker 11 to the base 12, the fixing assembly 111 of the speaker 11 is aligned with the locking assembly 124 of the base 12, and then the fixing assembly 111 of the speaker 11 is pressed into the locking assembly 124. Then the lock unit 1242 of the locking assembly 124 compresses the lock elastic element 1243, causing the fixed notch 12428 of the lock unit 1242 to align again with the fixed through hole 12401 of the lock housing 1241. The elastic restoring force of the lock pin elastic element 1245 drives the lock pin 1244 to be embedded within the fixed notch 12428, then the lock pin 1244 is engaged with the lock unit 1242. At the same time, the first concave 12424 of the moving element 12421 at one end of the lock unit 1242 and the second concave 12425 of the hook element 12422 will rotate relative to each other, causing the first concave 12424 and the second concave 12425 to be relatively closed. Consequently, it allows the stationary post 1112 of the fixing assembly 111 of the speaker 11 to be fixed within the locking assembly 124, thereby fixing the connection between the speaker 11 and the base 12.

In summary, the present application provides a speaker structure that includes a speaker and a base. The speaker is locked to the base. The base fixes or unlocks the speaker by means of a mutual linkage of a press assembly, a connecting assembly and a locking assembly. The locking assembly of the base is used to fix the speaker. The press assembly is used to moves in conjunction with the connecting assembly, and then the connecting assembly unlocks the speaker fixed by the locking assembly. This design allows the speaker to be easily detached from the base without taking too much time. In vehicle applications, the base of the speaker structure can be embedded and installed at an appropriate location within the vehicle body. For example, it can be fixedly installed on the flat area of the vehicle dashboard, embedded in the vehicle seat, or positioned in the central control area of the vehicle.

The above description illustrates and describes several preferred embodiments of the present invention. As mentioned earlier, it should be understood that the present invention is not limited to the forms disclosed herein and should not be considered as excluding other embodiments. It can be applied to various other combinations, modifications, and environments and can be adapted within the scope of the inventive concept as described herein through the teachings provided or knowledge and techniques of related fields. Modifications and variations made by those skilled in the art without departing from the spirit and scope of the present invention should be covered by the appended claims of the present invention.

The invention claimed is:

1. A speaker structure, comprising:

a speaker, having a fixing assembly; and a base, comprising:

- a case, a surface of the case having an accommodating groove and the speaker being installed within the accommodating groove;
- a press assembly, one end of the press assembly extending through the case;
- a connecting assembly disposed in the case; and
- a locking assembly disposed in the case, wherein the one end of the press assembly moves in conjunction with the connecting assembly, wherein the connecting assembly is configured for unlocking the locking assembly, wherein one end of the locking assembly extends through the case into the accommodating groove, and the one end of the locking assembly connects and fixes to the fixing assembly, and wherein when pushing the one end of the press assembly inward the case, the press assembly moves in conjunction with the connecting assembly to unlock the locking assembly, and the locking assembly is released from the connection and fixation with the fixing assembly of the speaker.

2. The speaker structure as claimed in claim 1, wherein the press assembly comprises:

a press element having a press portion and two extension portions, one end of each of the two extension portion extending from the press portion toward an inner part of the case; and a guide post disposed at the one end of the extension portion, and wherein the connecting assembly comprises a connection main body having two pushing portions extending from the connection main body toward the positions where the two extension portion of the press element are located, the pushing portion having a slide hole, the guide post at one end of the press element passing through the slide hole of the pushing portion, and the guide post of the press element moving along the slide hole.

3. The speaker structure as claimed in claim 2, wherein the press assembly comprises a press elastic member disposed between the press element and a surface of the case, and wherein an elastic force direction of the press elastic member and a movement direction of the press element is a first axis.

4. The speaker structure as claimed in claim 2, wherein the slide hole of the pushing portion forms an angle relative to the movement direction of the press element toward the pushing portion.

5. The speaker structure as claimed in claim 2, wherein the connection main body of the connecting assembly further comprises a pressing element, wherein the locking assembly further comprises a lock pin, and wherein the pressing element corresponds to the lock pin of the locking assembly, and when the press element drives the connection main body to move downward, the pressing element pushes down the lock pin to unlock the locking assembly, then the locking assembly releasing a connection and fixation relative to the fixing assembly.

6. The speaker structure as claimed in claim 5, wherein the connecting assembly further comprises a connecting elastic portion, the connection main body of the connecting assembly further comprises an elastic fixing portion, one end of the connecting elastic portion connects to the elastic fixing portion, and another end of the connecting elastic portion connects to the inner part of the case, wherein an elastic force direction of the connecting elastic portion and a direction that the pressing element of the connection main body pushes down the lock pin is a second axis.

7. The speaker structure as claimed in claim 5, wherein the locking assembly further comprises:

a lock housing disposed within the case; and a lock pin elastic element, one end of the lock pin elastic element connecting to the lock housing, and another end of the lock pin elastic element connecting to the lock pin, wherein an elastic force direction of the lock pin elastic element and a movement direction of the lock pin is the second axis.

8. The speaker structure as claimed in claim 5, wherein the locking assembly further comprises:

a lock housing disposed within the case;

a lock unit extending through the lock housing, one end of the lock unit extending through the case into the accommodating groove, the one end of the lock unit connecting and fixing to the fixing assembly of the speaker; and a lock elastic element, one end of the lock elastic element connecting to the lock housing, and another end of the lock elastic element connecting to another end of the lock unit, wherein the elastic force direction of the lock elastic element and the movement direction of the lock unit is the first axis.

9. The speaker structure as claimed in claim 1, wherein a recess contour of the accommodating groove corresponds to a contour of a side of the speaker having the fixing assembly.

10. The speaker structure as claimed in claim 1, wherein the fixing assembly comprises:

a recess; and a stationary post, two ends of the stationary post are fixed to a recess inner wall of the recess, and the one end of the lock unit is fixed to the stationary post within the recess.

* * * * *